Aug. 9, 1960     C. H. DE WHALLEY ET AL     2,948,668
ELECTRODIALYSING APPARATUS WITH SUPPORTED MEMBRANES
Filed Nov. 3, 1958
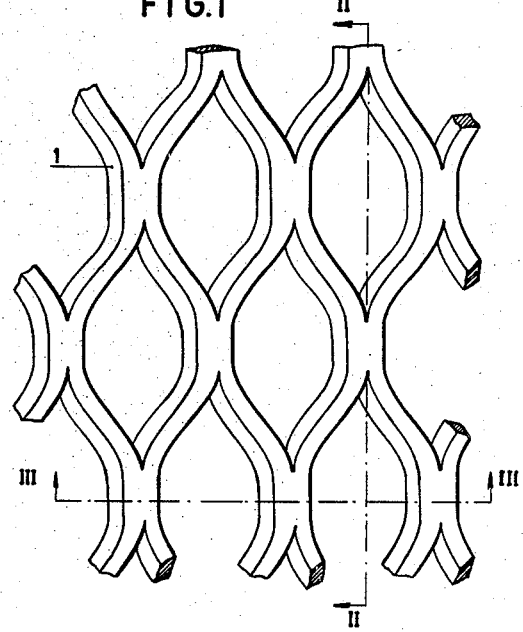
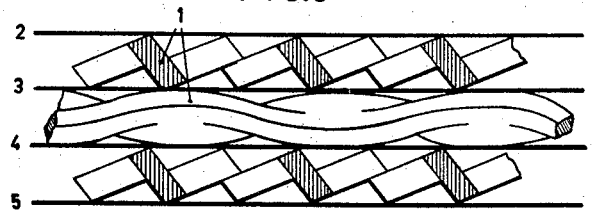
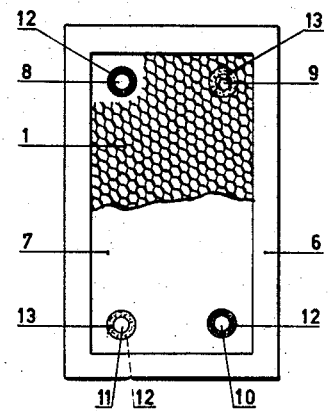
INVENTORS
CHRISTOPHER HUGH DEWHALLEY
CORNELIS VAN HOEK
BY
*Hammond and Littell*
ATTORNEYS

United States Patent Office 2,948,668
Patented Aug. 9, 1960

2,948,668

ELECTRODIALYSING APPARATUS WITH SUPPORTED MEMBRANES

Christopher Hugh de Whalley, Rickmansworth, England, and Cornelis van Hoek, Leiderdorp, Netherlands, assignors to Nederlandse Centrale Organisatie voor Toegepast-Natuurwetenschappelijk Onderzoek, The Hague, Netherlands Filed Nov. 3, 1958, Ser. No. 771,454

Claims priority, application Netherlands Nov. 2, 1957

2 Claims. (Cl. 204—301)

This invention relates to improved multi-cell continuous electrodialysis apparatus for the passage of ions from one stream of liquid into another stream. Examples of the use of such apparatus are desalting or concentrating liquids by ion exchange therebetween. Such apparatus contains a series of alternate dialysis or depletion cells and concentrating or rinsing cells formed between the anode chamber and the cathode chamber, by spaced, alternately arranged, positive and negative membranes, which are spaced apart by gasket-like cell frames and by spacers of corrugated perforated semi-rigid material such as polyvinyl chloride or polyethylenes.

This general type of multi-cell apparatus and of the said spacers within the cells is known from the U.S. Patents No. 2,735,812 and No. 2,758,083 both assigned to the assignee of this invention and both having one of the present inventors in common.

Generally, such an apparatus comprises an anode in an anode cell provided with a rinsing inlet and outlet. This anode cell is separated from the adjoining cell by an anion permeable membrane.

This adjoining cell has on its side opposite the anion permeable membrane, a cation permeable membrane by which it is separated from a third cell and so on. By such a series of spaced, alternately arranged, anion permeable membranes and cation permeable membranes which, together with gasket-like cell frames define cells therebetween, a series of alternate concentrating and dilution or depletion cells is formed.

At the end of this membrane stack a cathode cell is provided containing the cathode and an inlet and outlet for the cathode rinsing liquid.

The supply lines and the discharge lines for the liquid to the concentrating cells and diluting cells are in the form of separate manifolds, each connected with the desired series of cells, such as the series of diluting cells or with the series of concentrating cells. These manifolds may take the form of pipe lines outside of the membrane stack, and connected with the cells by apertures through the gaskets. Preferably, however the liquid supply lines consist of a series of holes through the gaskets and membranes of the membrane stack or of a series of holes in the membranes only, as described in the U.S. Patent No. 2,758,083, wherein each manifold is formed by a series of holes in the membranes and is connected with one series of the cells by resilient perforated spacers which are placed between each alternative pair of membranes and press against each of the borders around the holes of any other alternative pair of membranes, to prevent liquid flow or leakage between the manifold for one series of cells and the interior of the other series of cells. In this way connection between the desired cells is established inside the apparatus and exterior manifolds are rendered unnecessary. However, in apparatus containing some tens of cells and more the entire membrane stack may be subdivided in sub-stacks of membranes the manifolds of each of them having separate supply and/or discharge connections.

The membranes are spaced and separated at their edges by gaskets made from electrically insulating material such as soft rubber, polyvinyl chloride, polyethylene and like material, which has some resiliency, whereby a water-tight seal can be made between the gasket and the edges of the membranes when pressure is applied to both sides of the membrane stack.

The anion and cation permeable membranes may further be supported and spaced apart by spacers of corrugated perforated semi-rigid material, such as polyvinyl chloride in the manner described in U.S. Patent No. 2,735,812. The said spacers are very suitable, however since such spacers are not of a commercially available type, they have to be produced for the said purpose exclusively so that no mass production is possible.

The invention relates more particularly to an improvement in the spacers used in the cells to space apart each pair of adjacent membranes.

An object of the invention is to provide for a membrane spacer which causes a relatively strong turbulence in the flow of liquid through the cell so that it permits a relatively low velocity of flow of the said liquid in the cells.

A further object of the invention is to provide for a type of spacers which has at least the same advantageous features as the said spacers described in the U.S. Patent No. 2,735,812 and which are of a commercially available type.

Further objects of the invention will be apparent from the description below.

It has now been found that a very advantageous material to be used for the said membrane spacers is composed of sheet material which is corrugated in two or more intersecting directions, and which is provided with incisions at regular intervals.

In our preferred embodiment the spacers are produced from "expanded" insulating material. The expanded material is known per se and it is produced in approximately the following way.

A sheet of insulating material such as polyethylene, or polyvinyl chloride is provided with alternately placed rows of short incisions and then stretched or expanded in a direction perpendicular to the direction of the incisions until a lasting deformation is obtained. Thereby each incision has become an approximately rhomb-shaped aperture, the obtuse angles of the rhombs being rounded, each part of the material which is situated between two adjacent obtuse angles of said rhombs being in an inclined position with regard to the overall plane of the sheet, in such a way that all of said inclined parts are pointing in the same direction, giving the sheet a regularly bumpy pattern.

Owing to the particular shape of the wave-profile, this expanded material, even if made of relatively flexible material such as a sheet of polyvinylchloride of some tenths of a millimeter thickness has a fair resistance against compression in a direction perpendicular to the "plane" of the material.

The spacer of expanded insulating material can be used in an electrodialysis cell by placing it between the membranes in such a way, that the direction of the incisions as provided before the expansion coincides with the direction of flow of the liquid in the cell, which direction, in general, is determined by the relative positions of the inlet and outlet for the said liquid.

When the spacers are disposed in the said manner, the turbulence caused by them in the liquid which is passed through the cell is approximately equal to that which can be obtained in cells containing the spacers of corrugated and perforated material as described in the said U.S. Patent No. 2,735,812.

It is known in the field of art that the liquid flowing through each cell has to be in turbulent motion in order to prevent a polarization of the membrane surface of the permselective membranes. It has been proved that our new type of spacer surprisingly causes a noticeably stronger turbulence when it is positioned in the cell in such a way that the general direction of flow of the liquid through the said cell is approximately perpendicular to the direction of the incisions. By applying the spacer in this manner, it has now proved possible to reduce the amount of liquid flow through a cell to about half the amount required to keep the polarization of the membrane surface within the desired limits as compared with a similar cell which contains the above-mentioned prior art spacers. Therefore the pumping energy required is about the same in both cases. However, the lower rate of flow entailed by this present process yields the constructive advantage, that the inlet and outlet openings can be smaller, which is important in view of the extreme narrowness of the cell (which is in the order of magnitude of about 1 millimeter nowadays).

Further, notwithstanding the lower rate of flow through the various cells and as a result of the higher liquid resistance, a fair, even distribution of the liquid over all the compartments or cells which are connected in parallel is yet obtained.

The invention is illustrated by means of a preferred embodiment shown in the drawing, wherein:

Fig. 1 is a plan view on a sheet of expanded material, on an enlarged scale,

Fig. 2 is a cross-section along the line II—II of Fig. 1,

Fig. 3 is a cross-section of a number of membranes with spacers positioned therebetween, Fig. 4 is a view of the interior of a cell.

In the figures, the expanded material is indicated by reference numeral 1.

In Fig. 3 membranes 2, 3, 4 and 5 are shown, whereby between the membranes 2, 3 and 4, 5 the material 1 has been applied in the direction of lines II—II in Fig. 1 and between the membranes 3 and 4 in the direction of lines III—III in Fig. 1.

Fig. 4 shows a cell gasket 6 positioned on a membrane 7 having four holes 8, 9, 10 and 11. The holes 8 and 10 are surrounded by a ring-shaped body 12 of resilient material such as soft rubber, which prevents the liquid in the relevant cell from being in open contact with the liquid flowing through said holes 8 and 10 respectively. Similar ring-shaped bodies 12 are positioned below the membrane 7 and around the holes 9 and 11 respectively in order to prevent the liquid in the relevant cell from being into liquid connection with the liquid flowing through holes 9 and 11 respectively. Each of the holes 8, 9, 10 and 11 is a link in a series of similar holes and ring-shaped bodies which together form a manifold channel.

In order to provide for complete liquid tightness of the cell, around each ring-shaped body 12 thin rigid washers 13 are provided at the opposite side of the membranes adjacent to the said body 12 which washers are made of rigid isolation material such as hard polyvinylchloride.

The said preferred embodiment shown in the drawing was used in a multicell apparatus containing 800 cells of approximately 1 millimeter thickness. The membranes having outward dimensions of 100 by 40 centimeters, the total apparatus having 320 square meters of active membrane surface. This apparatus has been in operation, continuously producing 36 cubic meters of drinking-water from sea water daily.

It will be clear to anyone skilled in the art that electrodialyzing apparatus provided with the new spacers may vary widely as to detail, without their departing from the invention.

We claim:

1. In a multicell electrodialyzing apparatus comprising a membrane stack of alternately arranged cationic and anionic permselective membranes, insulating spacers interposed between said membranes to give a series of concentration and depletion cells, means for supplying and discharging liquids from said individual concentration and depletion cells and means of supplying an electric current across said concentration and depletion cells, the improvement which comprises using as said insulating spacer an integral sheet of semi-rigid, plastic, electrically-insulating, unexpanded spaced material incised and expanded at each incision to provide surfaces on each side of the sheet spaced from each other by a distance greater than original thickness of the unexpanded sheet, said surfaces being separated by apertures approximately rhomb-spaced with rounded obtuse angles, the plane of the material between each two adjacent obtuse angles of said rhombs being in an inclined position with regard to the plane of said surfaces.

2. The apparatus of claim 1 wherein said expanded spacers are positioned in said concentration and depletion cells so that the flow of liquid through said cells is approximately perpendicular to the direction of said unexpanded incisions.

References Cited in the file of this patent

UNITED STATES PATENTS

| | | |
|---|---|---|
| 2,735,812 | Van Hoek | Feb. 21, 1956 |
| 2,741,595 | Juda | Apr. 10, 1956 |
| 2,758,083 | Van Hoek et al. | Aug. 7, 1956 |
| 2,778,096 | Weema | Jan. 22, 1957 |